United States Patent [19]

Uchida et al.

[11] Patent Number: 5,678,183

[45] Date of Patent: Oct. 14, 1997

[54] MOBILE TRANSMITTER WHICH DOES NOT CAUSE A DISRUPTION OF COMMUNICATION WHEN MOVING BETWEEN COMMUNICATION SYSTEMS WITH DIFFERENT MODULATION SCHEMES

[75] Inventors: Wataru Uchida; Shigeru Kimura, both of Tokyo, Japan

[73] Assignee: NEC Corporation, Tokyo, Japan

[21] Appl. No.: 642,880

[22] Filed: May 6, 1996

Related U.S. Application Data

[62] Division of Ser. No. 361,215, Dec. 21, 1994.

[30] Foreign Application Priority Data

Dec. 24, 1993 [JP] Japan .................................. 5-327057

[51] Int. Cl.[6] .......................... H04M 11/00; H04Q 7/32
[52] U.S. Cl. ...................... 455/33.1; 455/93; 455/102; 375/216
[58] Field of Search .................... 455/33.1, 74, 76, 455/89, 93, 102, 33.2, 61, 103, 101; 379/59, 60; 375/216

[56] References Cited

U.S. PATENT DOCUMENTS

| | | | |
|---|---|---|---|
| 5,124,672 | 6/1992 | Kuisma | 455/93 |
| 5,179,360 | 1/1993 | Suzuki | 455/93 |
| 5,249,302 | 9/1993 | Metroka et al. | 455/93 |
| 5,291,516 | 3/1994 | Dixon et al. | 375/200 |
| 5,422,931 | 6/1995 | Austin-Lazarus et al. | 379/59 |
| 5,428,664 | 6/1995 | Kobayashi | 455/89 |
| 5,446,421 | 8/1995 | Kechkaylo | 455/102 |

FOREIGN PATENT DOCUMENTS

| | | | |
|---|---|---|---|
| 58-161427 | 9/1983 | Japan . | |
| 4-82334 | 3/1992 | Japan | 455/33.1 |

*Primary Examiner*—Reinhard J. Eisenzopf
*Assistant Examiner*—Lester G. Kincaid
*Attorney, Agent, or Firm*—Foley & Lardner

[57] ABSTRACT

A transmitting apparatus transmits at least one of a main and a supplementary modulated signal in response to a transmitting signal. The apparatus includes a first modulating circuit for modulating the transmitting signal in a main modulation system to produce the main modulated signal. The apparatus also includes a second modulating circuit for modulating the transmitting signal in a supplementary modulation system to produce the supplementary modulated signal. The apparatus further includes a selective supplying circuit for selectively supplying the transmitting signal to at least one of the first and second modulating systems. The apparatus also includes a control circuit connected to the first and second modulating circuits for controlling operation of the first and second modulating circuits and the selective supplying circuit.

8 Claims, 3 Drawing Sheets

5,678,183

MOBILE TRANSMITTER WHICH DOES NOT CAUSE A DISRUPTION OF COMMUNICATION WHEN MOVING BETWEEN COMMUNICATION SYSTEMS WITH DIFFERENT MODULATION SCHEMES

This application is a divisional, of application Ser. No. 08/361,215, filed Dec. 21, 1994.

BACKGROUND OF THE INVENTION

This invention relates to a communication system such as a mobile radio system and, in particular, to a terminal station including a receiving apparatus and a transmitting apparatus.

In a conventional communication system, it is possible to use various modulation systems for carrying out communication between the terminal station and a base station in the manner known in the art. One of the modulation systems is a frequency modulation system known in the art. Another of the modulation systems is a digital modulation system known in the art.

A mobile radio system is known as one of the conventional communication systems. The mobile radio system has a plurality of service areas or service zones which are generally adjacent to one another with a part thereof being overlapped to each other. In the mobile radio system, use is generally made of the frequency modulation system. In other words, each of the service areas is assigned with the frequency modulation system.

Recently, digital techniques have become remarkably advanced and widely used in the mobile radio system. Under the circumstances, the digital modulation system is often used in addition to the frequency modulation system in the mobile radio system. In this event, the digital and the frequency modulation systems are assigned to adjacent ones of the service areas, respectively. The adjacent service areas will be called hereinunder a main and a supplementary service area, respectively.

In the mobile radio system, it is assumed as a particular case that the terminal station moves between the main and the supplementary service areas. In the particular case, a change must be carried out between the digital modulation system and the frequency modulation system when the terminal station moves between the main and the supplementary service areas. The change will be called hereinunder a system change.

In the manner known in the art, it will be assumed that the communication is momentarily interrupted when the system change is carried out. In other words, the communication has a momentary interruption when the terminal station moves between the main and the supplementary service area.

In order to reduce a time of the momentary interruption, a prior art example is disclosed in Japanese Patent Prepublication (Kokai or Publication of Unexamined Patent Application) No. 161427/1983. In the prior art example, the system change is automatically carried out when the terminal station moves between the main and the supplementary service areas. However, it is impossible to eliminate the momentary interruption.

SUMMARY OF THE INVENTION

It is therefore an object of this invention to provide a terminal station for a communication system, which does not cause an interruption of communication when a change is carried out between a plurality of modulation systems assigned to service areas in the communication system, respectively.

It is another object of this invention to provide a receiving apparatus which is included in a terminal station of the type described.

It is still another object of this invention to provide a transmitting apparatus which is included in a terminal station of the type described.

Other objects of this invention will become clear as the description proceeds.

According to an aspect of this invention, there is provided a receiving apparatus for receiving at least one of a main and a supplementary modulated signal to produce a received signal. The main and the supplementary modulated signals are modulated in a main and a supplementary modulation system, respectively. The receiving apparatus comprises first processing means for processing the main and the supplementary modulated signals into a first processed signal, second processing means for processing the main and the supplementary modulated signals into a second processed signal, signal producing means connected to the first and the second processing means for producing a local signal in accordance with the first and the second processed signals, selecting means connected to the first processing means, the second processing means, and the signal producing means for selecting, as the received signal, one of the first processed, the second processed, and the local signals, and control means connected to the first processing means, the second processing means, and the selecting means for controlling operation of each of the first processing means, the second processing means, and the selecting means with reference to the first and the second processed signals.

According to another aspect of this invention, there is provided a transmitting apparatus for transmitting at least one of a main and a supplementary modulated signal in response to a transmitting signal. The transmitting apparatus comprises a first modulating circuit for modulating the transmitting signal in a main modulation system to produce the main modulated signal, a second modulating circuit for modulating the transmitting signal in a supplementary modulation system to produce the supplementary modulated signal, selectively supplying means for selectively supplying the transmitting signal to at least one of the first modulating and the second modulating circuits, and control means connected to the first and the second modulating circuits and the connecting means for controlling operation of the first and the second modulating circuits and the selectively supplying means.

According to still another aspect of this invention, there is provided a method of receiving at least one of a main and a supplementary modulated signal to produce a received signal. The main and the supplementary modulated signals are modulated in a main and a supplementary modulation system, respectively. The method comprises the steps of processing one of the main and the supplementary modulated signals into a first processed signal, processing one of the main and the supplementary modulated signals into a second processed signal, producing a local signal in accordance with the first and the second processed signals, selecting, as the received signal, one of the first processed, the second processed, and the local signals, and controlling operation of each of the first-mentioned processing, the second-mentioned processing, and the selecting steps with reference to the first and the second processed signals.

According to yet another aspect of this invention, there is provided a method of transmitting at least one of a main and a supplementary modulated signal in response to a transmitting signal. The method comprises the steps of modulating the transmitting signal in a main modulation system to produce the main modulated signal, modulating the transmitting signal in a supplementary modulation system to produce the supplementary modulated signal, selectively supplying the transmitting signal to at least one of the first modulating and the second modulating circuits, and controlling operation of the first-mentioned and the second-mentioned modulating steps and the selectively supplying step.

DESCRIPTION OF THE PREFERRED EMBODIMENT

First, description will be made as regards a mobile radio system comprising a fixed base station and a mobile radio terminal station which is communicable with the fixed base station. For example, the mobile radio terminal is one of a telephone set, a facsimile device, and a personal computer. In the manner known in the art, the mobile radio system has a plurality of service areas which are determined dependent on the fixed base station and which are adjacent to one another with an overlapped part thereof. Adjacent ones of the service areas will be called hereinunder a main and a supplementary service area, respectively. The mobile radio terminal station is movable between the main and the supplementary service areas. It will be assumed here that the main service area is assigned with a main or digital modulation system and that the supplementary service area is assigned with a supplementary or frequency modulation system. In this event, the mobile radio terminal station must be designed so that it is possible to receive each of a main and a supplementary modulated signal which are modulated in the digital modulation system and the frequency modulation system, respectively, and each of which is transmitted as a modulated radio signal from the fixed base station.

Figure 1:
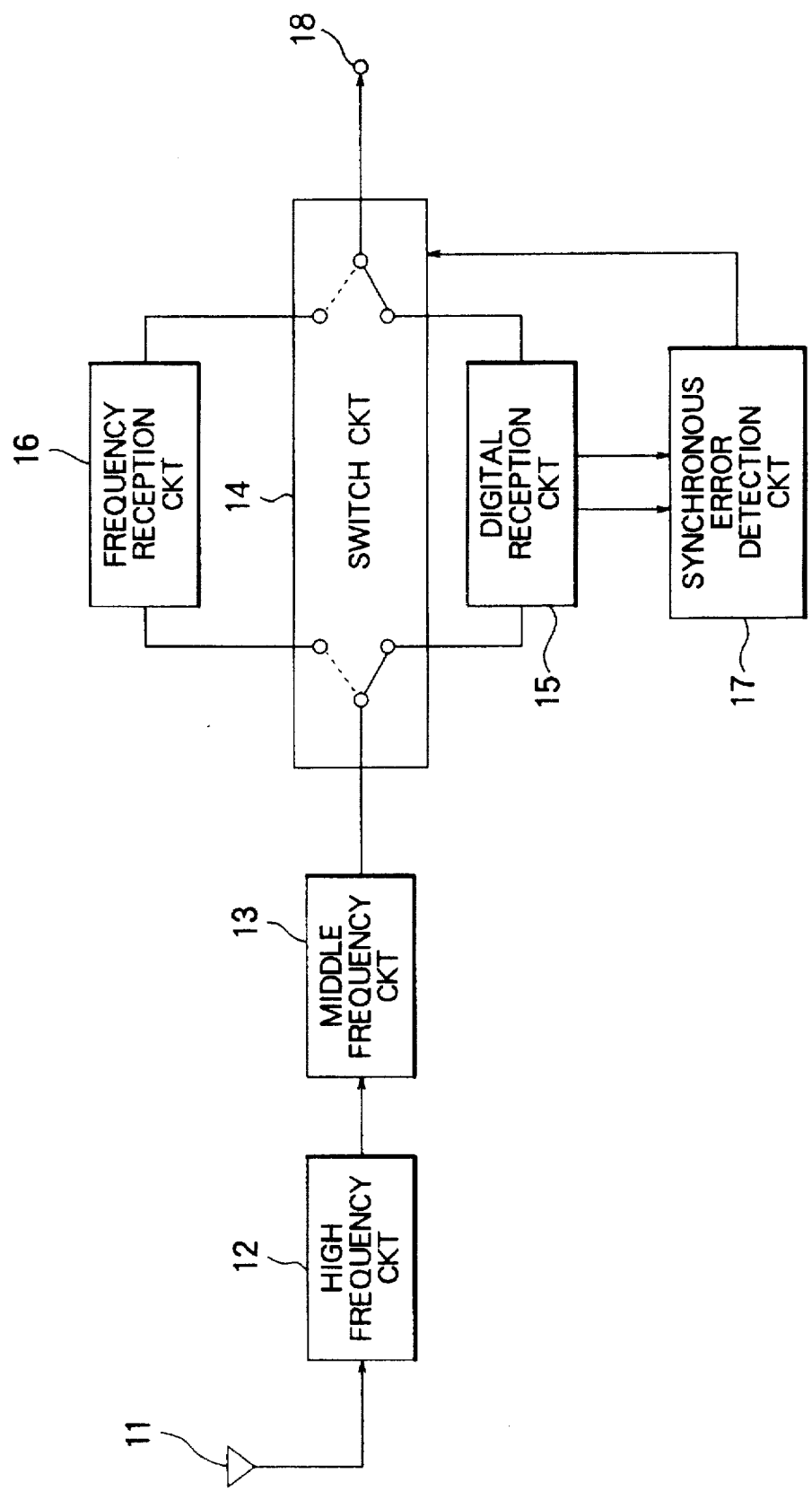
FIG. 1 is a block diagram of a conventional mobile radio terminal station.

Referring to FIG. 1, a conventional mobile radio terminal station will be described at first for a better understanding of the present invention. The conventional mobile radio terminal station is included in the mobile radio system and corresponds to the prior art example that is described in the preamble part.

In FIG. 1, the conventional mobile radio terminal station comprises an antenna 11, a high frequency circuit 12 connected to the antenna 11, a middle frequency circuit 13 connected to the high frequency circuit 12, a switch circuit 14 connected to the middle frequency circuit 13, a digital reception circuit 15 connected to the switch circuit 14, a frequency reception circuit 16 connected to the switch circuit 14, and a synchronous error detection circuit 17 connected to the digital reception circuit 15. The antenna 11 is for receiving the modulated radio signal to produce a modulated wire signal. The modulated wire signal is supplied to the switch circuit 14 through the high and the middle frequency circuits 12 and 13. The switch circuit 14 is for selecting a selected one of the digital and the frequency reception circuits 15 and 16 to supply the modulated wire signal to the selected one. Normally, the switch circuit 14 selects the digital reception circuit 15 as the selected one.

The digital reception circuit 15 is for receiving the main modulated signal included in the modulated wire signal. The frequency reception circuit 16 is for receiving the supplementary modulated signal included in the modulated wire signal. The synchronous error detection circuit 17 is for detecting a synchronous error of the main modulated signal to produce a synchronous error signal which is supplied to the switch circuit 14.

The description will be made as regards a case where the conventional mobile radio terminal station is present at the main service area. In the case, the digital reception circuit 15 is received with only the main modulated signal. Therefore, the digital reception circuit 15 produces a digital modulation output signal. The digital reception signal is supplied as an output signal to an output terminal 18 through the switch circuit 14.

When the mobile radio terminal station moves into the supplementary service area, the synchronous error detection circuit 17 detects the synchronous error to produce the synchronous error signal. Responsive to the synchronous error signal, the switch circuit 14 selects the frequency reception circuit 16 as the selected one. Therefore, the frequency reception circuit 16 produces a frequency reception signal. The frequency reception signal is supplied as the output signal to the output terminal 18 through the switch circuit 14.

In the mobile radio terminal station, a system change is automatically carried out when the terminal station moves between the main and the supplementary service areas. However, it is impossible to eliminate the momentary interruption.

Figure 2:
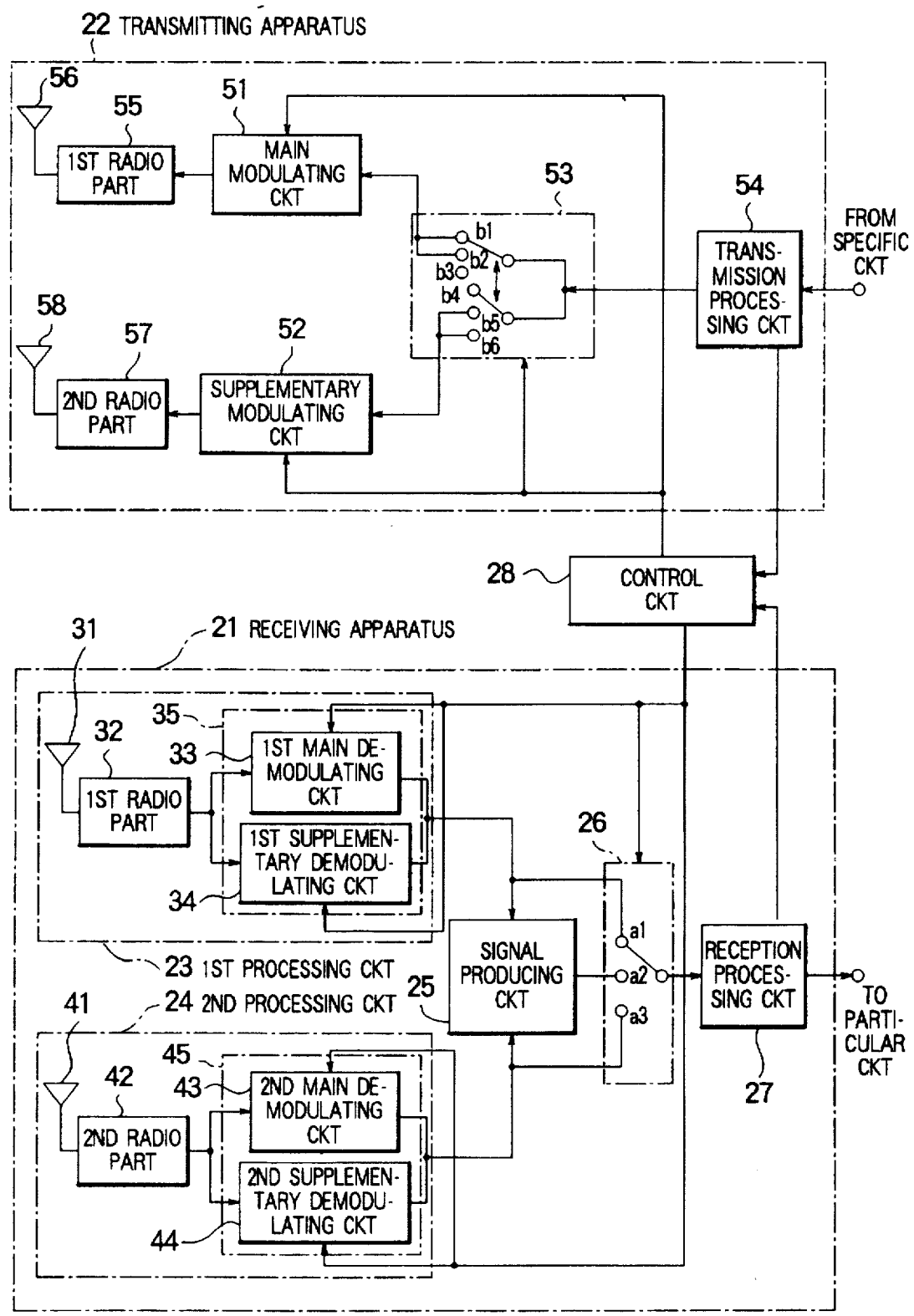
FIG. 2 is a block diagram of a mobile radio terminal station according to an embodiment of this invention.

Turning to FIG. 2, the description will be made as regards a mobile radio terminal station according to an embodiment of this invention. The mobile radio terminal station is mounted on an automobile and comprises a receiving apparatus 21 and a transmitting apparatus 22. In the manner which will presently be described in detail, the receiving apparatus 21 is for receiving the modulated radio signal that is transmitted from the fixed base station. The transmitting apparatus 22 is for transmitting another modulated radio signal towards the fixed base station in the manner which will later be described in detail.

The receiving apparatus 21 comprises a first processing circuit 23, a second processing circuit 24, a signal producing circuit 25, and a switch circuit 26. In the manner which will later be described in detail, the first processing circuit 23 is for processing the modulated radio signal, namely, the main and the supplementary modulated signals into a first processed signal. The second processing circuit 24 is for processing the modulated radio signal, namely, the main and the supplementary modulated signals into a second processed signal. The signal producing circuit 25 is connected to the first and the second processing circuits 23 and 24, respectively, and is for producing a local signal in accordance with the first and the second processed signals. The switch circuit 26 is connected to the first processing, the second processing, and the signal producing circuits 23, 24, and 25, respectively, and is for selecting, as a received signal, one of the first processed, the second processed, and the local signals to supply the received signal to a reception processing circuit 27 which is for processing the received signal into a processed input signal. The processed input signal is supplied to each of a control circuit 28 and a particular circuit (not shown) of the mobile radio terminal station. The switch circuit 26 is referred to as a selecting arrangement.

In addition, the control circuit 28 is connected to the first processing, the second processing, the switch, and the reception processing circuits 23, 24, 26, and 27, respectively. In the manner which will later be described in detail, the control circuit 28 is responsive to the processed input signal and is for controlling operation of each of the first processing, the second processing, the switch, and the reception processing circuits 23, 24, 26, and 27, respectively.

The first processing circuit 23 comprises a first antenna 31, a first radio part 32 connected to the first antenna 31, and first main and first supplementary demodulating circuits 33 and 34, respectively. The first main demodulating circuit 33 is connected to the first radio part 32 and is for demodulating the main modulated signal in the digital modulation system under control by the control circuit 28 to produce a first main demodulated signal as the first processed signal. The first supplementary demodulating circuit 34 is connected to the first radio part 32 and is for demodulating the supplementary modulated signal in the frequency modulating system under control by the control circuit 28 to produce a first supplementary demodulated signal as the first processed signal. A combination of the first main and the first supplementary demodulating circuits 33 and 34, respectively, will be called a first demodulating part 35.

The second processing circuit 24 comprises a second antenna 41, a second radio part 42 connected to the second antenna 41, and second main and second supplementary demodulating circuits 43 and 44, respectively. The second main demodulating circuit 43 is connected to the second radio part 42 and is for demodulating the main modulated signal in the digital modulation system under control by the control circuit 28 to produce a second main demodulated signal as the second processed signal. The second supplementary demodulating circuit 44 is connected to the second radio part 42 and is for demodulating the supplementary modulated signal in the frequency modulation system under control by the control circuit 28 to produce a second supplementary demodulated signal as the second processed signal. A combination of the second main and the second supplementary demodulating circuits 43 and 44, respectively, will be called a second demodulating part 45.

The signal producing circuit 25 comprises a diversity circuit which is known in the art and is connected to the first main, the first supplementary, the second main, and the second supplementary demodulating circuits 33, 34, 43, and 44, respectively. The signal producing circuit 25 is for combining the first and the second processed signals to produce the local signal in the manner known in the art.

The switch circuit 26 comprises first, second, and third contact points a1, a2, and a3, respectively. The first contact point a1 is connected to each of the first main and the first supplementary demodulating circuits 33 and 34. The second contact point a2 is connected to the signal producing circuit 25. The third contact point a3 is connected to each of the second main and the second supplementary demodulating circuits 43 and 44, respectively. The switch circuit 26 selectively connects the reception processing circuit 27 with one of the first, the second, and the third contact points a1, a2, and a3, respectively.

The transmitting apparatus 22 comprises a main modulating circuit 51, a supplementary modulating circuit 52, and a switch circuit 53. A transmission processing circuit 54 is controlled by the control circuit 28 and is supplied with an original signal from a specific circuit (not shown) of the mobile radio terminal station. Responsive to the original signal, the transmission processing circuit 54 produces a transmitting signal which is generally called a base band signal in the art. The transmitting signal is supplied to each of the control circuit 28 and the switch circuit 53.

The main modulating circuit 51 is for modulating the transmitting signal in the digital modulation system under control by the control circuit 28 to produce a main modulated signal which is transmitted as the modulated radio signal towards the fixed base station through a first radio part 55 and a first antenna 56. The supplementary modulating circuit 52 is for modulating the transmitting signal in the frequency modulation system under control by the control circuit 28 to produce a supplementary modulated signal which is transmitted as the modulated radio signal towards the fixed base station through a second radio part 57 and a second antenna 58. The switch circuit 53 is connected between the transmission processing circuit 54 and each of the main and the supplementary modulating circuits 51 and 52, respectively, and is for selectively supplying the transmitting signal to at least one of the main modulating and the supplementary modulating circuits 51 and 52, respectively. More particularly, the switch circuits 53 comprises first, second, third, fourth, fifth, and sixth contact points b1, b2, b3, b4, b5, and b6, respectively. Each of the first and the second contact points b1 and b2, respectively, is connected to the main modulating circuit 51. Each of the third and the fourth contact points b3 and b4, respectively, is idle. Each of the fifth and the sixth contact points b5 and b6, respectively, is connected to the supplementary modulating circuit 52. The switch circuit 53 selectively connects the transmission processing circuit 54 with one of a first pair of the first and the fourth contact points b1 and b4, respectively, a second pair of the second and the fifth contact points b2 and b5, respectively, and a third pair of the third and the sixth contact points b3 and b6. Each of the main modulating, the supplementary modulating, and the switch circuits 51, 52, and 53, respectively, has operation which is controlled by the control circuit 28 in the manner which will later be described in detail.

Figure 3:
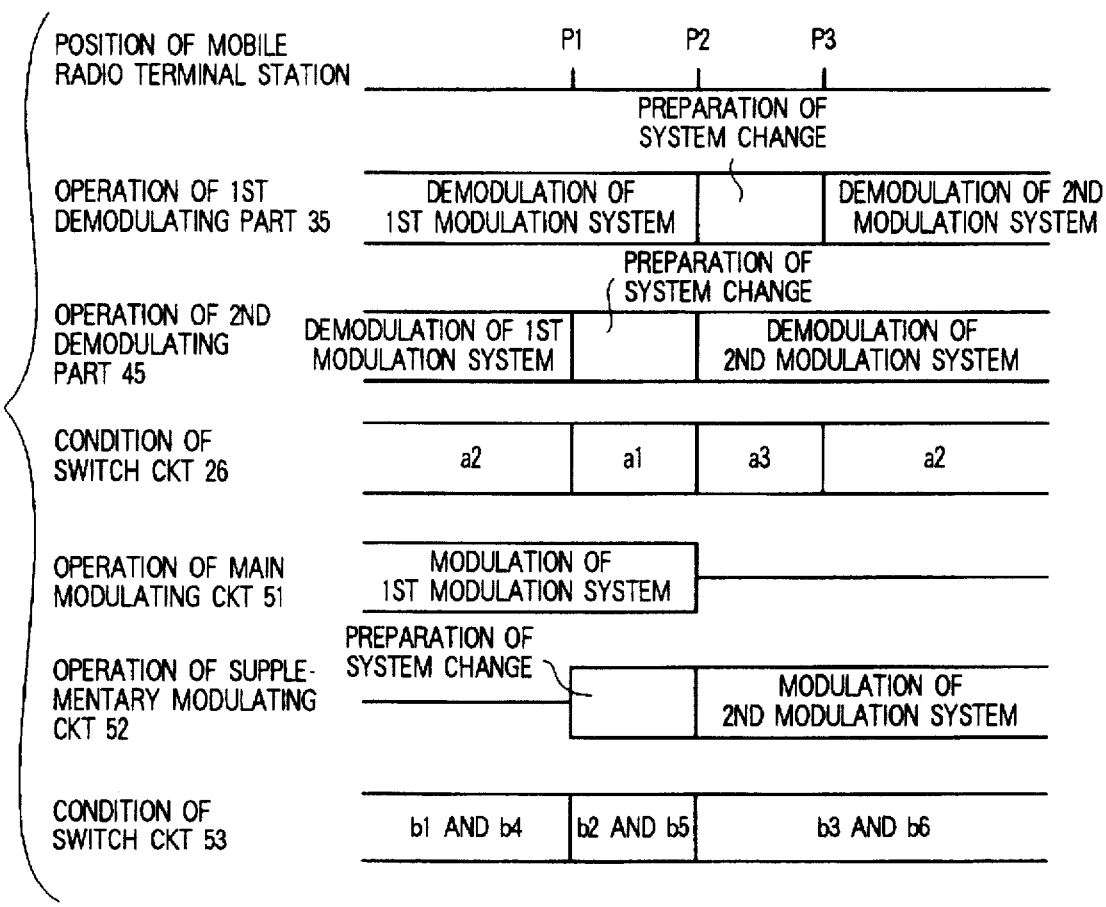
FIG. 3 is a view for describing operation of a control circuit included in the mobile radio terminal station of FIG. 2.

Turning to FIG. 3 together with FIG. 2, operation of the control circuit 28 will be described as regards a particular case where the mobile radio terminal station moves from the main service area to the supplementary service area. The fixed base station transmits a first and a second indication signal towards the radio terminal station that is present at a boundary area between the main and the supplementary service areas. The first indication signal is for indicating preparation of the system change and is transmitted when the fixed base station has a particular reception level which is lower than a predetermined reception level and is representative of entering of the radio terminal station into the supplementary service area. The second indication signal is for indicating execution of the system change and is transmitted when a first predetermined time lapses after transmission of the first indication signal. The receiving apparatus 21 can receive the first and the second indication signals as the modulated radio signal.

When the mobile radio terminal station is present at the main service area, the receiving apparatus 21 has operation controlled by the control circuit 28 in the manner which will be described in the following. Each of the first and the second supplementary demodulating circuits 34 and 44, respectively, is prevented from operation thereof. In other words, only each of the first main and the second main demodulating circuits 33 and 43, respectively, demodulates the main modulated signal in the digital modulation system. The switch circuit 26 connects the reception processing circuit 27 with the signal producing circuit 25 through the second contact point a2. In this event, the control circuit 28 will be referred to as a first making arrangement.

On the other hand, the transmitting apparatus 22 has operation controlled by the control circuit 28 in the manner which will be described in the following. The switch circuit 53 connects the transmission processing circuit 54 with only the main modulating circuit 51 through the first contact point b1. The main modulating circuit 51 modulates the transmitting signal in the digital modulation system while the supplementary modulating circuit 52 is prevented from operation thereof. In this event, the control circuit 28 will also be referred to as the first making arrangement.

Received with the first indication signal at a first position P1 of the main service area, the receiving apparatus 21 has operation controlled by the control circuit 28 in the manner which will be described in the following. The first main demodulating circuit 33 continues demodulation of the main modulated signal in the digital modulation system while each of the first supplementary and the second main demodulating circuits 34 and 43, respectively, is prevented from operation thereof. The second supplementary demodulating circuit 44 carries out the preparation of the system change. In other words, the second supplementary demodulating circuit 44 establishes synchronization in the frequency modulation system. The switch circuit 26 connects the reception processing circuit 27 with each of the first main and the first supplementary demodulating circuits 33 and 34, respectively, through the first contact point a1. In this event, the control circuit 28 will be referred to as a second making arrangement.

On the other hand, the operation of the transmitting apparatus 22 is controlled by the control circuit 28 in the manner which will be described in the following. The switch circuit 53 connects the transmission processing circuit 54 with the main and the supplementary modulating circuits 51 and 52, respectively, through the second and the fifth contact points b2 and b5, respectively. The main modulating circuit 51 continues modulation of the transmitting signal in the digital modulation system. The supplementary modulating circuit 52 carries out the preparation of the system change without modulating the transmitting signal. In other words, the supplementary modulating circuit 52 establishes synchronization in the frequency modulation system. In this event, the control circuit 28 will also be referred to as the second making arrangement.

When the mobile radio terminal station moves into the supplementary service area, the receiving apparatus 21 is received with the second indication signal at a second position P2 which is in the overlapped part that is between the main and the supplementary service areas. At the second position P2, the mobile radio terminal station has operation controlled by the control circuit 28 in the manner which will be described in the following. The first supplementary demodulating circuit 34 carries out the preparation of the system change. In other words, the first supplementary demodulating circuit 34 establishes synchronization in the frequency demodulation system. The second supplementary demodulating circuit 44 demodulates the supplementary modulated signal in the frequency modulation system. Each of the first main and the second main demodulating circuit 33 and 43, respectively, is prevented from operation thereof. The switch circuit 26 connects the reception processing circuit 27 with each of the second main and the second supplementary demodulating circuits 43 and 44, respectively, through the third contact point a3. In this event, the control circuit 28 will be referred to as a third making arrangement.

On the other hand, the operation of the transmitting apparatus 22 is controlled by the control circuit 28 in the manner which will be described in the following. The switch circuit 53 connects the transmission processing circuit 54 with only the supplementary modulating circuit 52 through the sixth contact point b6. The main modulating circuit 51 is prevented from operation thereof. The supplementary modulating circuit 52 modulates the received signal in the frequency modulation system. In this event, the control circuit 28 will also be referred to as the third making arrangement.

When the synchronization is established in the frequency modulation system at a third position P3 of the supplementary service area, or a particular time point after elapsing of a second predetermined time from transmission of the second indication signal, the first supplementary demodulating circuit 34 demodulates the supplementary modulated signal in the frequency modulation system with the second supplementary demodulating circuit 44 being continued demodulation of the supplementary modulated signal. Each of the first and the second main demodulating circuits 33 and 43, respectively, is prevented from operation thereof. The switch circuit 26 connects the reception processing circuit 27 with the signal producing circuit 25 through the second contact point a2. In this event, the control circuit 28 will be referred to as a fourth making arrangement. In this connection, the operation of the transmitting apparatus 22 is not changed.

While the present invention has thus far been described in connection with a few embodiments thereof, it will readily be possible for those skilled in the art to put this invention into practice in various other manners. For example, a single antenna may be used in place of using the first antenna 31 of the receiving apparatus 21 and the first antenna 56 of the transmitting apparatus 22. Similarly, another single antenna may be used in place of using the second antenna 41 of the receiving apparatus 21 and the second antenna 58 of the transmitting apparatus 22. Although the description has been made as regards the case where the mobile radio terminal station moves from the main service area to the supplementary service area, similar operation can be obtained when the mobile radio terminal station moves from the supplementary service area to the main service area. The mobile radio terminal station may be carried by each of various mobile objects.

What is claimed is:

1. A transmitting apparatus for transmitting at least one of a main and a supplementary modulated signal in response to a transmitting signal even when said transmitting apparatus moves between a main and a supplementary service area to which said main and said supplementary modulated signals are assigned, respectively, said transmitting apparatus comprising:

a first modulating circuit for modulating said transmitting signal in a main modulation system to produce said main modulated signal;

a second modulating circuit for modulating said transmitting signal in a supplementary modulation system to produce said supplementary modulated signal;

selectively supplying means for selectively supplying said transmitting signal to at least one said first modulating and said second modulating circuits; and control means connected to said first and second modulating circuits and said selectively supplying means for controlling operation of said first and second modulating circuits and said selectively supplying means, wherein said control means comprises:

first making means for making said first modulating circuit modulate said transmitting signal;

second making means for making said first modulating circuit modulate said transmitting signal while said second modulating circuit receives said transmitting signal and carries out preparation for modulating said transmitting signal;

third making means for making said second modulating circuit modulate said transmitting signal; and actuating means connected to said first through third making means for actuating said first through third making means in a sequential order starting with said first making means and ending with said third making means when said transmitting apparatus is moved from said main service area to said supplementary service area.

2. A method of transmitting at least one of a main and a supplementary modulated signal in response to a transmitting signal, said method comprising the steps of:

modulating, as a first modulating step, said transmitting signal in a main modulating system to produce said main modulated signal;

modulating, as a second modulating step, said transmitting signal in a supplementary modulating system to produce said supplementary modulated signal;

selectively supplying said transmitting signal to a least one of said first modulating and said second modulating systems; and controlling operation of said first and said second modulating steps and said selectively supplying step, wherein said controlling step comprises the steps of:

making, as a first making step, said first modulating circuit modulate said transmitting signal;

making, as a second making step, said first modulating circuit modulate said transmitting signal while said second modulating circuit receives said transmitting signal and carries out preparation for modulating said transmitting signal;

making, as a third making step, said second modulating circuit modulate said transmitting signal; and actuating said first through said third making steps in a sequential order starting with the first making step and ending with the third making step when said transmitting apparatus is moved from said main service area to said supplementary service area.

3. A transmitting method for transmitting at least one of a main and a supplementary modulated signal from a mobile unit to a base station, the method comprising the steps of:

a) transmitting the main modulated signal from the mobile unit to the base station while the mobile unit is located in a main service area which provides communications with the mobile unit utilizing the main modulated signal, the main modulated signal being modulated with a transmitting signal containing information to be transmitted from said mobile unit;

b) receiving a first indication signal from the base station, the first indication signal indicating that a reception level at the base station corresponding to the main modulated signal is below a set level, the first indication signal being indicative of movement of the mobile unit from the main service area to a supplementary service area, wherein the supplementary service area provides communications with the mobile unit utilizing the supplementary modulated signal;

c) in response to the first indication signal received by the mobile unit, transmitting the main modulated signal from the mobile unit to the base station, the main modulated signal being modulated with the transmitting signal, and at the same time, carrying out preparation for transmitting the supplementary modulated signal by transmitting the supplementary modulated signal without being modulated by the transmitting signal;

d) receiving a second indication signal by the mobile unit, the second indication signal being indicative of movement of the mobile unit into an area serviceable by both the main service area and the supplementary service area; and e) in response to the second indication signal received by the mobile unit, modulating the supplementary modulated signal with the transmitting signal and transmitting only the supplementary modulated signal from the mobile unit.

4. The transmitting method according to claim 3, wherein, during the step c), the preparation for transmitting the supplementary modulated signal comprises establishing synchronization with a base station in the supplementary service area by transmitting the supplementary modulated signal without being modulated by the transmitting signal as a synchronization signal.

5. The transmitting method according to claim 4, wherein the area serviceable by both the main and supplementary service areas is an area that is at a periphery of both said main and supplementary service areas.

6. A transmitting apparatus within a mobile unit for transmitting at least one of a main and a supplementary modulated signal in response to a transmitting signal to be transmitted by said mobile unit, the transmitting apparatus comprising:

an input port configured to receive said transmitting signal;

a first antenna;

a second antenna;

a first modulating circuit connected to said first antenna and configured to modulate said transmitting signal in a main modulation system to produce said main modulated signal;

a second modulating circuit connected to said second antenna and configured to modulate said transmitting signal in a supplementary modulation system to produce said supplementary modulated signal;

a switch connected to said input port and said first and second modulating circuits, said switch being configured to operate in a first state in which only said main modulated circuit is connected to said input port, a second state in which both said main modulated circuit and said supplementary modulated circuit are connected to said input port, and a third state in which only said supplementary modulated circuit is connected to said input port; and a control circuit connected to said switch and configured to operate said switch in one of said first, second and third states based on control signals received from a base station, wherein said control circuit operates said switch in said first state to allow for communication from said mobile unit to said base station utilizing said main modulated signal when said mobile unit is located in a main service area that allows for communications utilizing said main modulated signal, wherein, upon reception of a first control signal by said control circuit which is indicative of a reception level at said base station of said main modulated signal being below a predetermined level, said control circuit operates said switch in said second state to allow for communication from said mobile unit to said base station utilizing said main modulated signal, while at the same time carrying out preparation for changing over to said supplementary modulated signal by transmitting said supplementary modulated signal without modulating said transmitting signal, said supplementary modulated signal being utilized in a supplementary service area, and wherein, upon receipt of a second control signal by said control circuit which is indicative of said mobile unit being located in an area serviceable by both said main and supplementary service areas, said control circuit operates said switch in said third state to allow for communication from said mobile unit utilizing only said supplementary modulated signal, wherein said supplementary modulated signal is modulated with said transmitting signal when said switch is in said third state.

7. The transmitting apparatus according to claim 6, wherein the preparation for changing over to the supplementary modulated signal while the switch is in the second state comprises establishing synchronization with a base station in said supplementary service area by transmitting said supplementary modulated signal without modulating said transmitting signal.

8. The transmitting apparatus according to claim 7, wherein the area serviceable by both the main and supplementary service areas is an area that is at a periphery of both said main and supplementary service areas.

* * * * *